Figure 8:
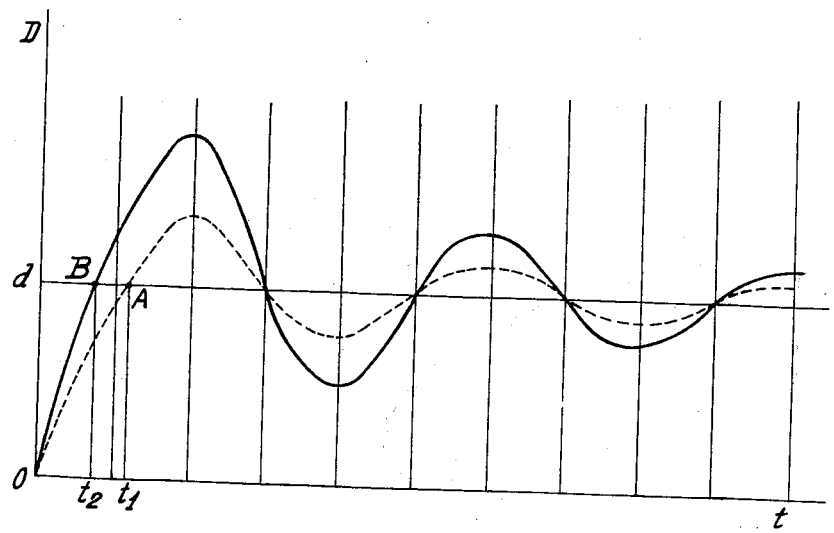

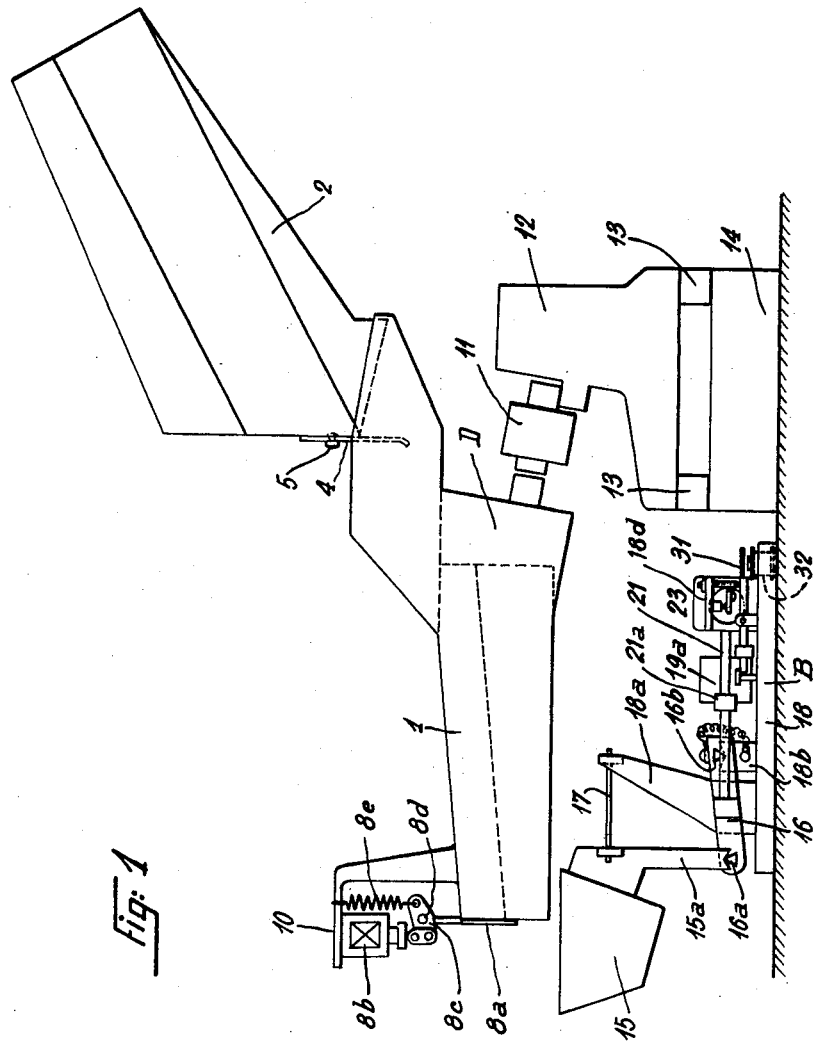

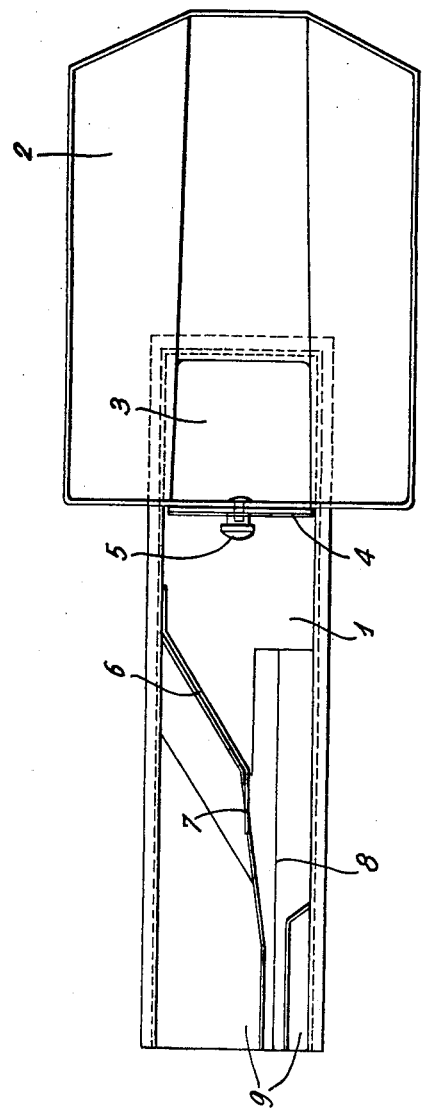

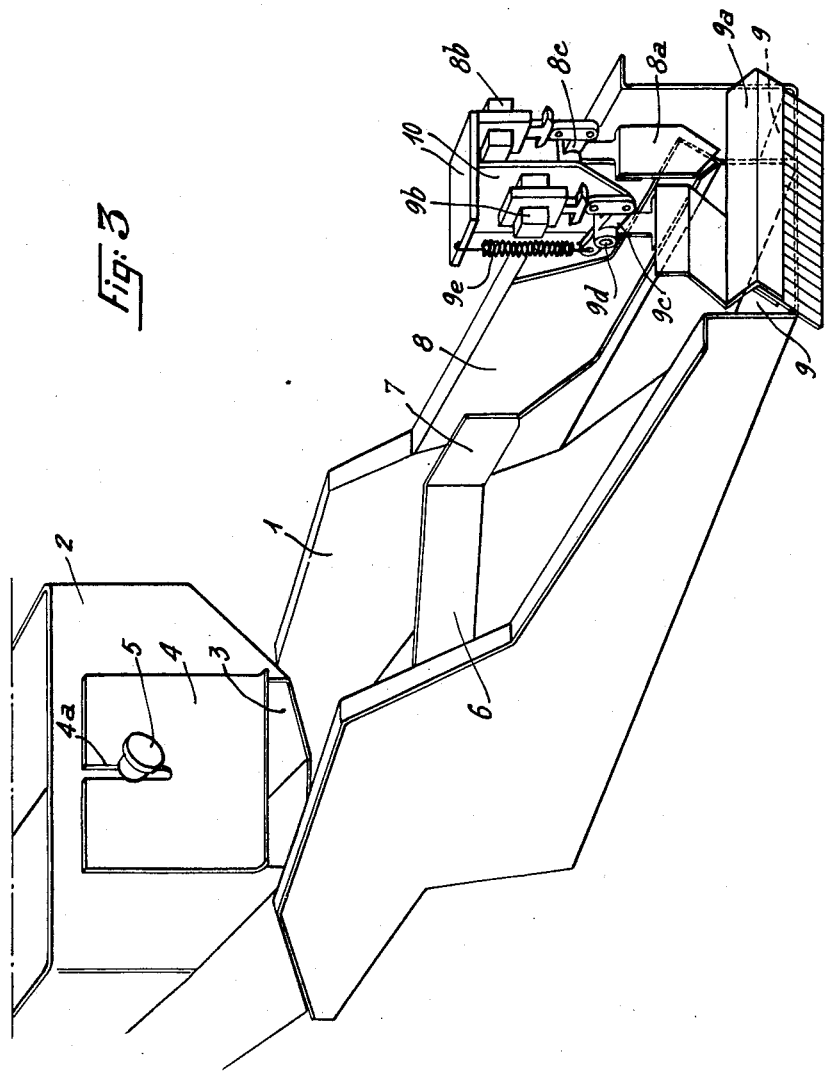

Feb. 5, 1963  B. ROUBAN  3,076,516
AUTOMATIC WEIGHING MACHINES FOR GRANULAR PRODUCTS
Filed July 1, 1959  6 Sheets-Sheet 4
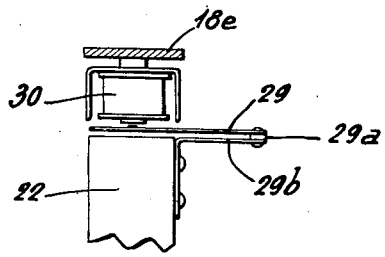
Fig: 6
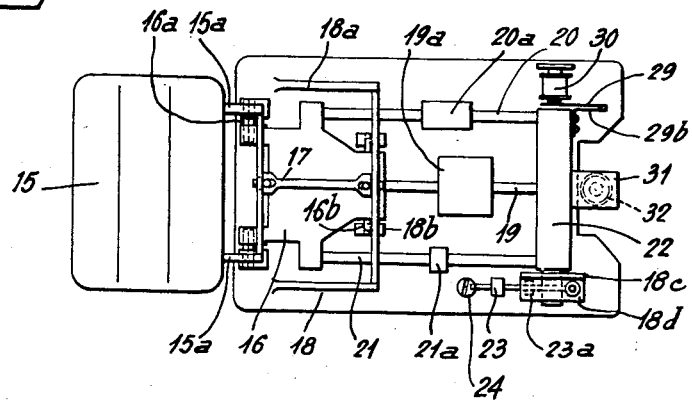
Fig: 4
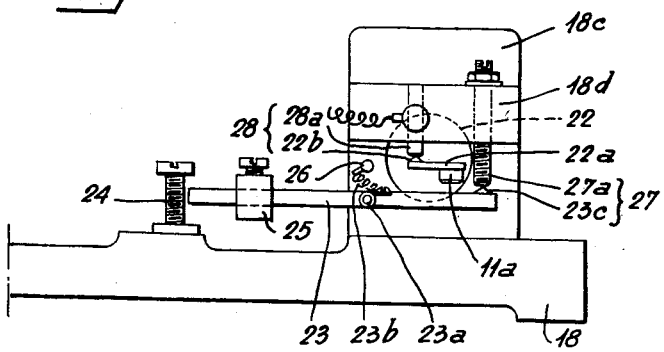
Fig: 5
INVENTOR
Basile Rouban
By Watson, Cole, Grindle & Watson
ATTORNEYS

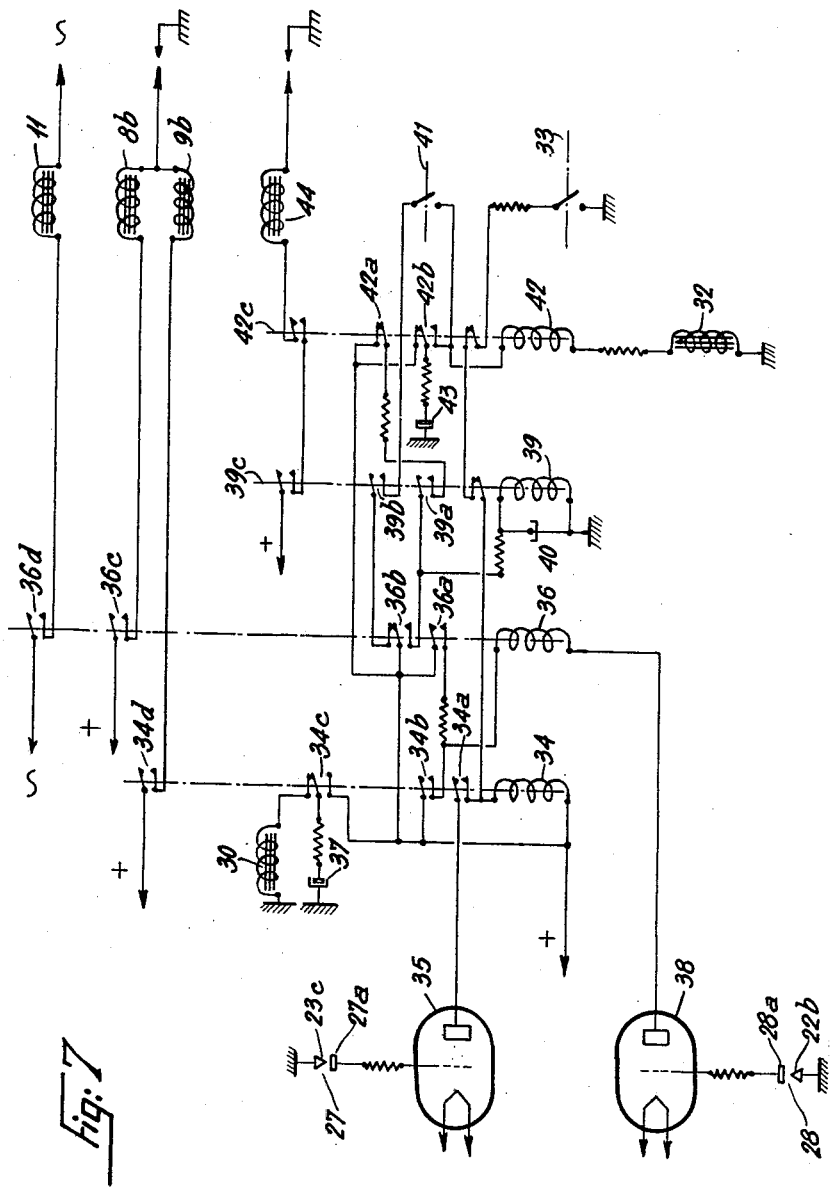

United States Patent Office 3,076,516
Patented Feb. 5, 1963

3,076,516
AUTOMATIC WEIGHING MACHINES FOR GRANULAR PRODUCTS
Basile Rouban, Clamart, France, assignor to Les Successeurs de B. Trayvou, Rhone, France, a company of France
Filed July 1, 1959, Ser. No. 824,385
Claims priority, application France July 9, 1958
6 Claims. (Cl. 177—81)

The weighing of granular products, more particularly when the weight per unit of the product is relatively considerable with respect to the value of the amount weighed (in the case of confectionery for example) presents some problems as regards distribution and weighing.

In particular, it is necessary to obtain the most uniform flow of the product which can be achieved if it is desired to obtain the maximum accuracy at a weighing station coupled to an automatic conditioning group. The distribution of the product must also be effected unit by unit at the end of weighing if the element of the product being weighed reaches a weight in the vicinity of or exceeding the permissible limits of the quantity weighed.

In order to meet these requirements, it has already been proposed to provide a weighing balance with a distributor comprising two channels, one channel known as the finishing channel, of such a cross-section that the products to be weighed line up therein in the form of a column of units, that is to say unit by unit, and the other channel known as the preliminary channel.

In this way it is easy to carry out weighing in two stages from a single flow device, for example, upon the opening of a hopper.

It is also known that weighing on a single weighing balance in this way normally requires two successive calculations or tarings of the weighing device, one for the preliminary stage and the other for the finishing stage, and also involves an inoperative period of the balance at the end of the preliminary stage and before the commencement of the finishing stage, to restore the dial, beam or the like to a zero position, which inoperative period is incompatible with obtaining a high rate of output.

According to this invention an automatic weighing machine for granular products adapted to carry out weighing in two successive stages, that is to say, a preliminary stage and a finishing stage, by means of a single balance, is characterised in that means are provided for immobilizing the balance beam in the position which it occupies at the end of the preliminary stage.

The present invention makes it possible to reduce the idle period considerably, by providing means for immobilizing the balance beam at the end of the preliminary stage under such conditions that no vertical reaction is applied to the beam during the unlocking of the latter.

Owing to this fact, it is also possible to proceed with taring the balance for the second stage whilst the beam is immobilized, so that no disturbing oscillation is produced at the beginning of this second stage.

Moreover, the invention eliminates the necessity for the conventional shock-absorbing device on the balance, which makes it possible to obtain more accurate weighing. Weighing errors obtained with these automatic distributors are caused chiefly by the differences resulting from the excess quantity of product falling through after distribution is interrupted. Now, this quantity depends on the flow of the product at the end of weighing and on the time corresponding to the inertia of the control system between the weighing device and the distributor; eliminating the shock-absorbing device considerably reduces this inertia time in the control system for stopping distribution.

The various devices of the distributor and balance are controlled by an electronic device which acts on the law of movement of the assembly, as soon as the signal to commence the weighing cycle is emitted.

One embodiment of the invention is illustrated in the accompanying drawings, wherein:

FIG. 1 is a diagrammatic elevation of a balance-distributor group.
FIG. 2 is a plan view of the distributor.
FIG. 3 is a perspective view of the distributor and of its closure shutters.
FIG. 4 is a plan view of the balance.
FIG. 5 is an elevation, on a larger scale, of a detail included in FIG. 4.
FIG. 6 is a plan view, on a larger scale, of the device for immobilizing the balance beam.
FIG. 7 is a circuit diagram illustrating the electronic control circuit of the weighing machine.
FIG. 8 is a graph showing the effect of a shock-absorbing device on the oscillations of the balance beam of a balance.

In the embodiment of the invention illustrated in the drawings, the weighing machine comprises a group constituted by the distributor D and a balance B (FIG. 1).

The distributor includes a distributing channel or "table" 1 inclined downwardly and supplied from a hopper 2 whose outlet orifice 3 (FIGS. 2 and 3) is provided with a shutter 4 whereby the operative height of this orifice can be regulated and consequently the height of the layer of product issuing from the hopper can be controlled. A screw 5, co-operating with a slot 4a (FIG. 3) in the shutter 4, enables the shutter to be secured in a selected control position.

The distributing table 1 includes an obstacle formed by a deflecting shield 6 which is directed obliquely forwards and whose front end 7 is connected to an elevated finishing channel 8. The cross-section of the channel 8, which is V-shaped in the embodiment illustrated, is so determined that the said channel when in use arranges the product in a column of units, the excess falling on either side of the channel 8 into the front portion of the distributing table which forms a preliminary channel 9.

Associated with the finishing channel 8 is a shutter 8a controlled by an electromagnet 8b. The preliminary channel 9 is associated with a shutter 9a actuated by an electromagnet 9b.

These various accessories are mounted on a support 10 of the table 1. Each shutter 8a, 9a is secured to a lever 8c, 9c, respectively, pivotally mounted on a pin 8d, 9d, respectively, and connected on the one hand to the armature of the corresponding electromagnet and on the other hand to a restoring spring 8e (FIG. 1), 9e (FIG. 3), respectively, which tends to hold the shutter closed.

The distributor is supported by means of an electromagnet 11 from an inertia mass 12 which is mounted by means of damping pads 13 on a base 14.

The electromagnet 11 is energised by an alternating current which imparts to the distributing table 1 a vibratory movement whose amplitude depends on the intensity of the current, the axis of this vibration being offset with respect to the axes of the channels 8 and 9 in order to cause the product to be weighed to flow.

The product falls into a container 15 (FIGS. 1 and 4) of the balance B. The container 15 is fixed to a support 15a resting on knife-edges 16a of a balance beam 16 and held by a counter-beam 17. The counter-beam 17 is connected to a support 18a on the balance base 18.

The beam 16 is pivotable about knife-edges 16b which engage on brackets 18b on the base 18. The beam is extended beyond the support 18b by bars 19, 20 and 21 (FIG. 4) comprising graduated scales and carrying respectively cursors 19a, 20a and 21a, the first two of which are used for taring the balance and the third for the compensation work which is conventional in weighing apparatus of the kind envisaged here. The graduated bars 19, 20 and 21 are connected to each other at their tare side ends by a cross-member 22.

As FIG. 5 shows, the cross-member 22 can abut at one end, under the influence of the tare and by means of a finger 22a, against a lever 23 pivotable on a pin 23a carried by a support 18c on the base 18, the lever 23 being adapted to bear on the underside of the head of a screw 24 engaged in the base 18.

An adjustable-position weight 25 slidable on the lever 23 makes it possible to provide variable resistance to the assembly constituted by the balance beam and its accessories through the agency of the support point constituted by the pin 23a.

The lever 23 is connected electrically to the body of the apparatus by the conductor 23b and the terminal 26. At its end opposite from the screw 24 the lever 23 carries a contact stud 23c aligned with a further stud 27a which is vertically adjustable and is fixed to a small bar 18d of insulating material secured to the support 18c on the base 18.

The two studs 23c and 27a form an electric contact 27 which will be referred to hereinafter.

The finger 22a at one end of the cross-member 22, connected electrically to the body of the apparatus, includes a contact stud 22b which is aligned with a stud 28a carried by the insulating bar 18d. The studs 22b and 28a form a contact 28. The cross-member 22 carries at its other end (FIG. 6) a flexible elastic armature 29 situated in a plane perpendicular to the bearing line of the central knife-edges 16b, one end 29a of the armature being secured in a support 29b which is secured to the cross-member 22. This armature 29 is of slight thickness relatively to its width so as to be flexible perpendicularly to the axis of oscillation of the balance beam. It is associated with an electromagnet 30 carried by a support 18e secured to the base 18 and by means of which it is possible to immobilise the balance beam.

The cross-member 22 carries at its central portion (FIGS. 1 and 4) an armature 31 co-operating with a fixed electromagnet 32 and which permits the balance beam to be brought to abut the lever 23 which itself abuts the screw 24.

The balance and distributor which have just been described are controlled by an electronic device whose circuit diagram is illustrated in FIG. 7 and which operates in the following manner:

The closing of an electric contact 33 energises a relay 34. By means of its contact 34a, the relay 34 is held in the working position, interposing itself in the cathode-anode circuit of an electronic valve 35. By this is meant that the source of direct current potential (not shown) which is connected to the arrow at the lower end of relay 34, is connected to the anode of tube 35 through contacts 34a. Tube 35 now acts as a diode and cathode-anode current flows because its grid circuit is open at contacts 23c—27a. This current flows through relay 34 to hold the relay in its actuated position. The armature actuated by the relay 34 is connected to contacts 34b, 34c and 34d which, respectively, cause a second relay 36 to be energised, a condenser 37 to be charged, and the electromagnet 9b to be energised.

The electromagnet 9b (FIG. 3) causes the lifting of the shutter 9a of the preliminary channel 9.

The armature actuated by the relay 36 is connected to contacts 36a, 36b, 36c and 36d which, respectively, cause the relay 36 to remain in the cathode-anode circuit of a second electronic valve 38, a third relay 39 to be energised, the electromagnet 8b to be energised, the latter lifting the shutter 8a (FIG. 3) of the finishing channel 8, and the electromagnet 11 of the distributor to be energised. Tube 38 now acts as a diode and conducts in a manner similar to tube 35, because contacts 28a, 22b, connected in series in the grid circuit of tube 38, are open. The armature actuated by the relay 39 is connected to contacts 39a, 39b and 39c. The contact 39a causes a condenser 40 connected in parallel with the relay 39 to be charged.

Under the influence of the vibration, the product is poured into the container 15 of the balance by the two distributing channels 8 and 9. When the weight of the poured product reaches the value of the tare of the balance, minus the action of the weight 25, the balance beam takes up its position of equilibrium and the lever 23, in following the movement of the beam, causes the closing of the contact 27 (studs 23c and 27a, FIG. 5).

The closing of the electric contact 27 makes it possible to apply a certain cutoff bias voltage to the control grid of the electronic valve 35, thus cutting off the anode current of this valve, and the relay 34 is de-energised. The bringing of the relay 34 into the rest position causes the discharge of the condenser 37 to the electromagnet 30 and the opening of the energization circuit of the electromagnet 9b. The energising of the electromagnet 30 causes, during the discharge time of the condenser 37, the attraction of the armature 29, immobilising the balance beam.

The bending of the armature 29 is effected perpendicularly to the axis of oscillation of the balance beam and in a plane passing through the bearing line of the central knife-edges, having no effect on the balance.

Since the electromagnet 9b is no longer energised, the shutter 9a closes the channel 9. As the distributor continues to operate, because the electromagnet 11 is still energised, only the product coming from the finishing channel 8 is poured into the container of the balance, unit by unit.

At this stage, the lever 23 is in abutment, through the stud 23c, with the stud 27a and its action on the balance beam is annulled. Therefore, at the moment when the equilibrium is established between the real tare of the balance and the weight of the product poured, the balance beam resumes its travel to abut, by means of the stud 22b on the stud 28a, thus closing the contact 28. Thus, regulation of the position of the weight 25 makes it possible to vary the deviation in the value of the tare of the balance between the preliminary stage and the finishing stage of weighing.

The closing of the contact 28 applies a cutoff bias voltage to the control grid of the electronic valve 38, thus cutting off the anode current of this valve; the relay 36 is de-energised.

Bringing the relay 36 to the rest position causes the opening of the supply circuit of the electromagnet 8b, and thus the closing of the channel 8 by the shutter 8a and the opening of the supply circuit of the electromagnet 11, thus stopping the distributor.

By closing a contact 41 (FIG. 7), a fourth relay 42 is made to operate an armature which is connected to contacts 42a, 42b and 42c, and the electromagnet 32 is energised by means of the contact 39b of the relay 39, which has remained in the working position, and of the contact 36b of the relay 36. Energising the relay 42 interrupts, by means of the contact 42a, the supply of the relay 39, which remains energised during the discharge time of a condenser 40, and discharges a condenser 43, which is in a charged state at the inoperative position of the relay 42, to the coil of the relay 42 by means of the contact 42b.

The relay 42 is constructed so that its time delay is greater than the time-delay of the relay 39, and therefore an electromagnet 44 is energised, through the contacts 39c and 42c, during the time which elapses between the energising of the relay 42 and the de-energising of the relay 39. The electromagnet 44 controls the opening of the container of the balance and thus ensures the emptying thereof. This control has not been shown since it can be effected by any known means.

The electromagnet 32, energised, attracts the armature 31 which is secured to the balance beam 16, returning the latter to its initial position (FIG. 4), that is to say abutting on the lever 23; the energisation time of this electromagnet 32 is limited by the discharge time of the condenser 43. The contact 33 can be considered as a starting switch, the contact 41 being capable of being controlled manually or automatically depending on the way in which the weighing machine is used, that is, as semi-automatic equipment or automatic equipment coupled with a conditioning group.

In FIG. 8 there is shown a graph illustrating the displacements D of the beam of a balance as a function of time $t$. The broken line represents the oscillations of the beam of a balance provided with a shock-absorber, the said beam, under the influence of a received load, tending to take up a position of equilibrium corresponding to the ordinate $d$. This position $d$ is reached for the first time at the end of the period of time $t_1$, which corresponds to the point A.

If the shock-absorber is dispensed with (its only effect is to reduce the amplitude of the oscillations without changing the frequency) the displacement of the beam is represented by the continuous line. Under these circumstances the period of time $t_2$, at the end of which the position of equilibrium $d$ is reached for the first time (point B), is shorter than $t_1$.

If the point O corresponds to the position of the balance beam at the beginning of the finishing stage, that is, after the locking of this beam by means of the armature 29 and the electromagnet 30, and if the distance $d$ is that through which the beam must travel to pass from this position to the position where it causes the closing of the contact 28 (detection of equilibrium at the end of weighing), it will be seen that the duration of the finishing stage is reduced and that in addition the time lag in the control system between the weighing device and the distributor is also reduced which, as indicated hereinbefore, reduces the weighing errors.

It will be apparent that modifications may be made to the forms of embodiment which have just been described, more particularly by substitution of equivalent technical means, without departing from the scope of the present invention.

What I claim and desire to secure by Letters Patent is:

1. In an automatic weighing machine for granular materials comprising a balance having a base, a beam pivotally mounted on said base and supporting a container for the materials to be weighed, a distributing device adapted to feed said container with a bulk feed and a dribble feed of materials and distinct combinations of weights effective during bulk and dribble feeds, respectively, the combination of means for stopping said bulk feed when said beam reaches a predetermined position, means between said base and said beam for momentarily locking said beam on said base, and means responsive to the movement of said beam for simultaneously operating said bulk feed stopping means and said beam locking means whereby said beam may be momentarily locked on said base upon stopping of said bulk feed, for the purpose set forth.

2. The combination of claim 1 wherein said beam locking means are electromagnetic means and said means responsive to the movement of said beam comprise a condenser and means for electrically connecting said condenser to said electromagnetic means.

3. An automatic weighing machine for granular materials comprising in combination a balance having a base, a beam pivotally mounted on said base intermediate its ends and supporting on one side a container for materials to be weighed and on the other side adjustable weights whereby the balance may be tared; a distributing device adapted to feed said container with a bulk feed and a dribble feed of materials and provided with electromagnetic means for selectively stopping said bulk feed and said dribble feed; a two armed lever pivoted on said base, one arm of said lever being provided with an adjustable weight whereas the other arm is adapted to support said other side of said beam whereby said adjustable weight of said lever may act in opposition to said weights on said beam; electromagnetic means between said base and said beam for locking said beam on said base; a first stationary contact on said base and a corresponding contact on said lever, said contacts being adapted to be separated from each other when said beam is supported by said lever, means for electrically connecting said first stationary contact to said bulk feed stopping means and to said electromagnetic locking means, a second stationary contact on said base and a corresponding contact on said beam and means for electrically connecting said second stationary contact to said dribble feed stopping means.

4. The combination of claim 3, wherein said first stationary contact is adapted to constitute a stop for said lever.

5. The combination of claim 3 wherein electromagnetic means are provided between said beam and said base for bringing back said beam to abutment onto said lever at the end of weighing, means being provided for connecting said second stationary contact to said last-mentioned electromagnetic means.

6. The combination of claim 3 wherein said means for electrically connecting said first stationary contact to said bulk feed stopping means and to said electromagnetic locking means comprise an electronic valve having a grid connected to said first contact, a first relay inserted in the charging circuit of said valve and adapted, when energized, to cause said bulk feed stopping means to be inoperative, said means for electrically connecting said second stationary contact to said dribble feed stopping means comprising a second electronic valve having a grid connected to said second contact and a second relay inserted in the charging circuit of said second valve and adapted when energized to cause said dribble feed stopping means to be inoperative, said first relay being adapted to maintain said second relay, whereby said first and second contacts may act to render said bulk feed stopping means and said dribble feed stopping means operative for the purpose specified.

References Cited in the file of this patent

UNITED STATES PATENTS

| | | |
|---|---|---|
| 748,055 | Driver et al. | Dec. 29, 1903 |
| 1,913,868 | Andreas | June 13, 1933 |
| 2,011,608 | Belknap | Aug. 20, 1935 |
| 2,016,703 | Breaden et al. | Oct. 8, 1935 |
| 2,058,775 | Cundall | Oct. 27, 1936 |
| 2,345,287 | Peterson | Mar. 28, 1944 |
| 2,626,042 | Aldridge | Jan. 20, 1953 |
| 2,661,201 | Bowes | Dec. 1, 1953 |
| 2,726,061 | Schieser et al. | Dec. 6, 1955 |
| 2,842,330 | Hopkins | July 8, 1958 |

FOREIGN PATENTS

| | | |
|---|---|---|
| 743,407 | Great Britain | Jan. 18, 1956 |